United States Patent [19]
Sakata

[11] Patent Number: 6,100,543
[45] Date of Patent: Aug. 8, 2000

[54] ELECTRO-ABSORPTION TYPE SEMICONDUCTOR OPTICAL MODULATOR HAVING A QUANTUM WELL STRUCTURE

[75] Inventor: Yasutaka Sakata, Tokyo, Japan

[73] Assignee: NEC Corporation, Tokyo, Japan

[21] Appl. No.: 08/865,808

[22] Filed: May 30, 1997

[51] Int. Cl.$^7$ .......................... H01L 29/06; H01L 31/072
[52] U.S. Cl. .............................. 257/21; 257/22; 257/185; 257/191
[58] Field of Search .................................. 257/14, 21, 22, 257/184, 185, 191, 458

[56] References Cited

FOREIGN PATENT DOCUMENTS

| | | |
|---|---|---|
| 62-85227 | 4/1987 | Japan . |
| 5-335551 | 12/1993 | Japan . |
| 6-82852 | 3/1994 | Japan . |
| 7-99369 | 4/1995 | Japan . |
| 7-113991 | 5/1995 | Japan . |

OTHER PUBLICATIONS

W. Chen et al., "Quantum–confined Stark shift for differently shaped quantum wells", pp. 828–836, Semiconductor Science and Technology, vol. 7, No. 6, Jun. 1992.

G. Bastard et al., "Variational Calculation on a Quantum Well in an Electric Field", *Physical Review B*, vol. 28, No. 6, Sep. 15, 1983, pp. 3241–3245.

Y. Inomoto et al., "Low Voltage Drive and High Power Operation in DFB–LD/Modulator Integrated Light Source", *General Assembly of the Institute of Electronics, Information and Communication Engineers*, 1995, 347.

*Primary Examiner*—Minh Loan Tran
*Attorney, Agent, or Firm*—Young & Thompson

[57] ABSTRACT

Disclosed is an electro-absorption type semiconductor optical modulator utilizing the Quantum Confinement Stark Effect, in which a quantum well structure introduced in its optical absorption layer is arranged to have a potential structure such that one of the electron affinity and the energy of the top of the valence band increases in the laminating direction, while the other decreases, thereby canceling the built-in field. It is intended to lower the drive voltage and to enhance an on/off ratio (extinction ratio). Thus, the absorption peak becomes narrow at a no bias state to attain a low drive voltage and an enhanced extinction ratio.

1 Claim, 8 Drawing Sheets

Fig.2a-1
PRIOR ART
WITHOUT FIELD

Fig.2a-2
PRIOR ART
WITH BUILT-IN FIELD (NO BIAS)

Fig.2b-1
WITHOUT FIELD

Fig.2b-2
WITH BUILT-IN FIELD (NO BIAS)

ELECTRO-ABSORPTION TYPE SEMICONDUCTOR OPTICAL MODULATOR HAVING A QUANTUM WELL STRUCTURE

FIELD OF THE INVENTION

The present invention relates to a semiconductor optical modulator, and more specifically, to a quantum well structured electro-absorption type optical modulator utilizing the Quantum Confinement Stark Effect.

DESCRIPTION OF THE RELATED ART

Figure 1:
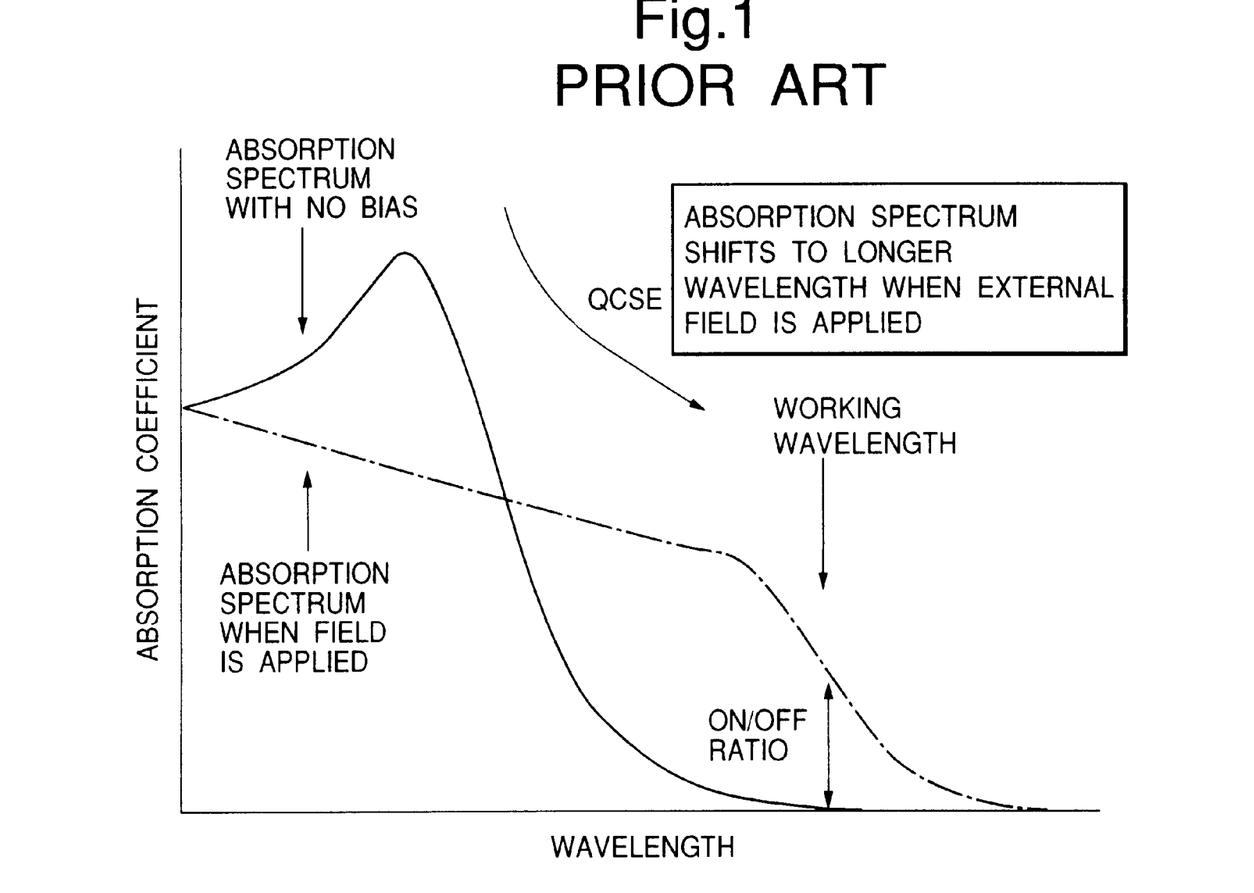
FIG. 1 is an optical absorption spectrum for illustrating the working principle of an EA modulator.

External modulation using an electro-absorption (EA) light modulator is a very effective means for long distance fiber optic communication over several tens to several hundreds of kilometers or more at a high speed of 2.5–10 gigabit per second (Gb/s) or higher, because compared with a direct laser modulation system, it has very low wavelength fluctuation (wavelength chirping) when modulated. As shown in FIG. 1, the conventional EA modulator performs the on-off operation by utilizing the fact that, when the modulator is reversely biased, the absorption spectrum shifts to a longer wavelength to vary the absorption coefficient in the operating wavelength. Thus, it is important to obtain larger variation of the absorption coefficient with a low applied voltage. When the modulation speed is more and more increased, the drive voltage is necessary to be lowered due to limitation from a drive circuit. Recently, research and development is being widely conducted on an EA modulator which employs a Multiple Quantum Well (MQW) structure in its absorption layer which allows it to utilize the Quantum Confined Stark Effect (QCSE).

For example, Inomoto et. al. reported an MQW-EA modulator in the General Assembly of the Institute of Electronics, Information and Communication Engineers, 1995 (Papers of General Assembly of the Institute of Electronics, Information and Communication Engineers, 1995, Electronics 1, C-347). This first conventional method uses a structure in which the well width of the MQW is made wider to increase energy shift due to QCSE (hereinafter called "QCSE shift") so that low voltage operation could be attained.

In addition, Wakita et al. also proposes an MQW-EA modulator in Japanese Patent Application Laid-open No. 5-335551. This second conventional method proposes a structure which introduces compressive strain into the well layer of MQW to increase the effective mass of holes so that low voltage operation can be attained by the increased QCSE.

Since the amount of QCSE shift increases in proportion to the fourth power of the well width in the MQW structure, and to the effective mass of holes (G. Bastard, et al., "Variational calculation on a quantum well in an electric field," Physical Review B, 3241 (1983)), the MQW structures such as seen in the first and second conventional methods are very effective for low voltage operation. However, since the absorption layer of the EA modulator is positioned to be the i-layer of a p-i-n structure, a reverse field is applied because of built-in voltage even when no external bias is applied to the device. Therefore, the larger the QCSE shift provided by a structure, the larger the amount of QCSE shift caused by its built-in electric field. Since the QCSE shift caused by the built-in field does not contributes to the modulation, the effect fails to sufficiently function for lowering the drive voltage.

It is therefore, an object of the present invention to eliminate the useless QCSE shift caused by the built-in voltage so as to lower the drive voltage and to attain a larger extinction ratio.

Moreover, in the conventional quantum well structure, even when the externally applied field is zero, shifting and broadening of the absorption spectrum are caused by the QCSE caused from the built-in field. Accordingly, in order to keep the absorption loss sufficiently low with respect to the working wavelength in a state where no externally applied field is applied (on state), it is necessary to have a large bandgap energy difference between the working wavelength and the quantum well structure's excitonic peak wavelength in the EA modulator. Therefore a large amount of QCSE shift is required leading to use of a high drive voltage.

It is threfore, another object of the presnt invention to provide an electro-absorption type semiconductor optical modulator having a reduced energy difference between the working wavelength and the quantum well excitution peak wavelength thus capable of working with low drive voltage.

BRIEF SUMMARY OF THE INVENTION

To attain the above objects, the present invention provides an electro-absorption-type semiconductor optical modulator comprising a light absorption layer, the absorption layer having a quantum well structure and being positioned at the i-layer portion of a p-i-n layer structure, wherein the electron affinity in one well layer increases toward the p region, while the energy of the top of the valence band decreases toward the p region.

In addition, there is provided a electroabsorption type semiconductor optical modulator wherein the electron affinity in one well layer increases toward the p region, while the energy of the top of valence band decreases toward the p region, thereby canceling a built-in field in the well layer.

Furthermore, there is provided an electro-absorption type semiconductor optical modulator comprising a light absorption layer, the absorption layer having a quantum well structure and being positioned at the i-layer of a p-i-n layer structure, wherein the electron affinity in one well layer increases toward the p region, while the energy of the top of valence band decreases toward the p region, the lattice constant of semiconductor material constituting the well layer increasing toward the p region within the well layer.

Furthermore, there is provided an electro-absorption type semiconductor optical modulator comprising a light absorption layer, the absorption layer having a quantum well structure and being positioned at the i-layer of a p-i-n layer structure, wherein the electron affinity in one well layer increases stepwise toward the p region, while the energy of the top of valence band decreases stepwise toward the p region.

Furthermore, there is provided an electro-absorption type semiconductor optical modulator having a p-i-n structure, the modulator comprising a light absorption layer, the light absorption layer having a multiple quantum well ssstructure which comprises a plurality of well layers and a plurality of barrier layers, wherein a well layer closer to the p region in the multiquantum well structure has a higher electron affinity and lower energy of the top of valence band.

Furthermore, there is provided an electro-absorption type semiconductor optical modulator comprising a light absorption layer, the absorption layer having a quantum well structure and being positioned at the i-layer of a p-i-n layer structure, wherein the composition of semiconductor material constituting the well layer varies in the well layer, so that transition probability between the wave function of electron in the well layer and that of hole becomes the maximum in a state where the built-in field is applied.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

An embodiment of a semiconductor optical modulator according to the present invention will be described with reference to the drawings.

Figures 2A, 2A:
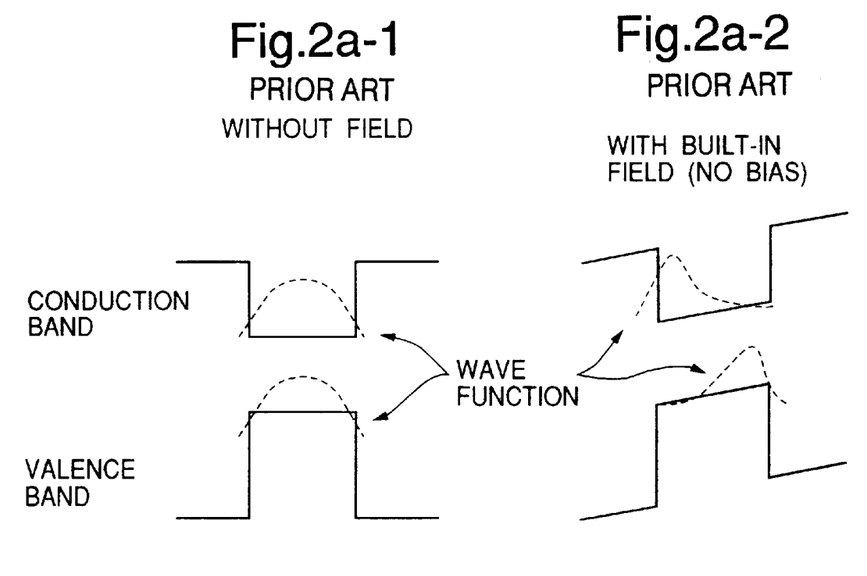
FIG. 2(a) and FIG. 2(b) are band diagrams of a quantum well for illustrating the operation.
Figure 2B:
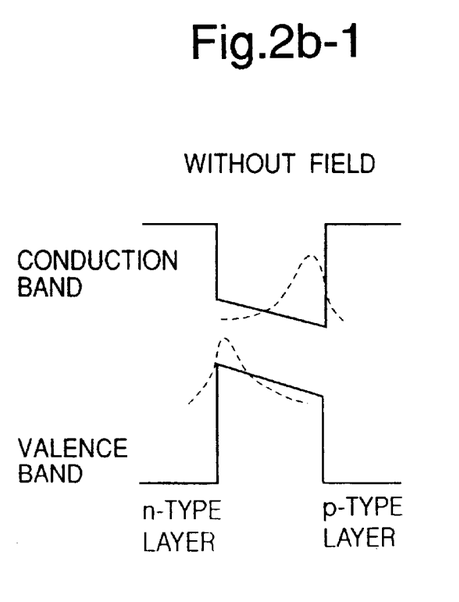
Figure 2B:
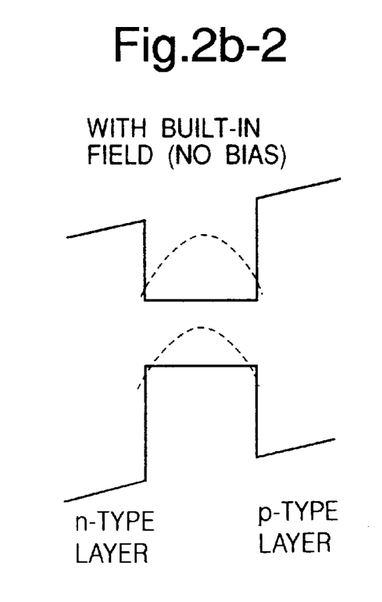

FIG. 2 shows the potential structure and wave function distribution of a quantum well structure used in a conventional MQW-EA modulator (FIG. 2a), and those of a quantum well structure used in an MQW-EA modulator of the present invention (FIG. 2b). These figures show a state without electric field and with a built-in field applied. As seen from the figure, in the conventional quantum well structure, the potential is already inclined by the built-in field, causing polarization in the wave functions of electron and hole. On the other hand, in the quantum well structure of the present invention, by providing inclination on the potential under the no-field state, the potential is made flat when the built-in field is applied. Accordingly, both wave functions of electron and hole are distributed at the center of the quantum well, so that the absorption coefficient, or light transition probability determined by the overlapping integration of the two wave functions reaches a maximum value, and the exciton absorption spectrum becomes extremely narrow and steep.

Figure 3:
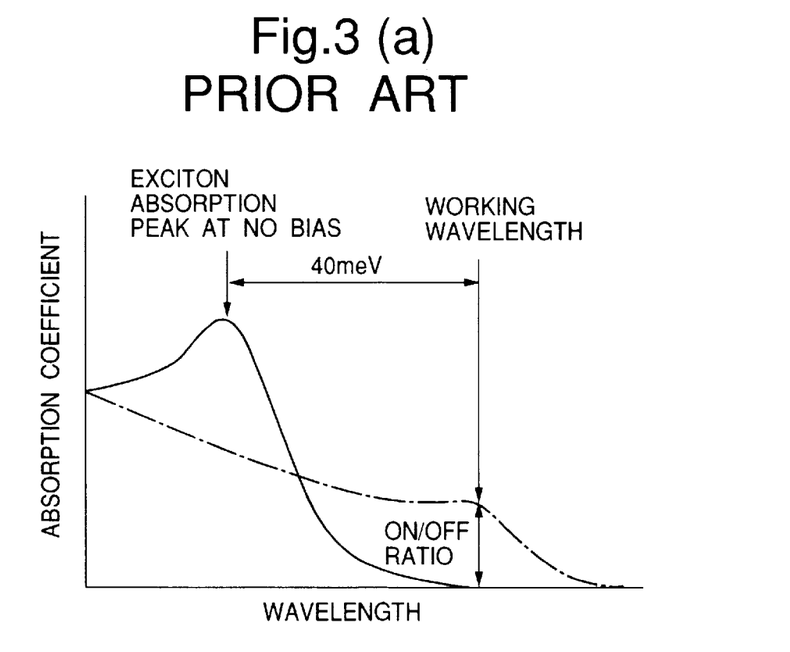
FIG. 3(a) and FIG. 3(b) are optical absorption spectra for illustrating the operation.

FIG. 3 shows changes of the absorption spectrum when an external field is applied to the quantum well structure used in the conventional MQW-EA modulator (FIG. 3a) and the quantum well structure used in the MQW-EA modulator of the present invention (FIG. 3b). The EA modulator is turned on or off by varying the absorption coefficient at the working wavelength through modulation of the external field (in reverse biasing direction) applied to the modulator. Accordingly, the larger the change of the absorption coefficient at the working wavelength, the larger the on/off ratio (extinction ratio).

As described earlier, in the conventional quantum well structure, even when the externally applied field is zero, shifting and broadening of the absorption spectrum are caused by the QCSE caused from the built-in field. Accordingly, in order to keep the absorption loss sufficiently low with respect to the working wavelength in a state where no externally applied field is applied (on state), it is necessary to take the bandgap energy difference between the working wavelength and the quantum well structure in the EA modulator in excess of 30–40 meV (bandgap wavelength difference of 60–70 mn if the working wavelength is 1.55 (m) (conventional methods 1 and 2).

On the other hand, in the quantum well structure of the present invention, when the externally applied field is zero, since no QCSE is caused by the built-in voltage, the absorption spectrum is not shifted, and it maintains a sharp peak structure. Accordingly, in order to keep the absorption loss sufficiently low with respect to the working wavelength in a state where no external electric field is applied (on state), it is sufficient to take the bandgap energy difference between the working wavelength and the quantum well structure's excitonic peak wavelength to be about 20 meV (bandgap wavelength difference of 40 nm if the working wavelength is 1.55 (m). Therefore, it becomes possible to obtain large variation of the absorption coefficient even with a small amount of QCSE shift, so that both use of low drive voltage and enhancement of the extinction ration can be simultaneously attained.

Now, a method is described for attaining the quantum well structure with the potential structure used for the EA modulator of the present invention. The band structure of well layer in the quantum well structure should be arranged to cancel the built-in field. In other words, the electron affinity and the energy of the top of valence band are necessary to vary in such a manner that one of them decreases, while the other increases. To attain such a structure, in a case of an InGaAsP semiconductor, for example, there is an approach in which tensile strain is applied to the well layer, and the amount of strain is monotonically changed in the well layer.

Figure 4A:
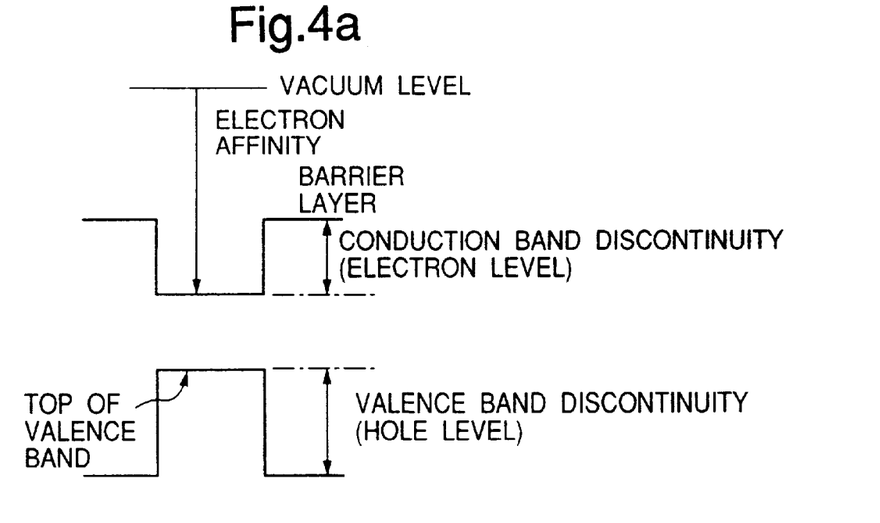
FIG. 4 is a band diagram for illustrating the operation, and a graph showing relationship between strain and band discontinuity.
Figure 4B:
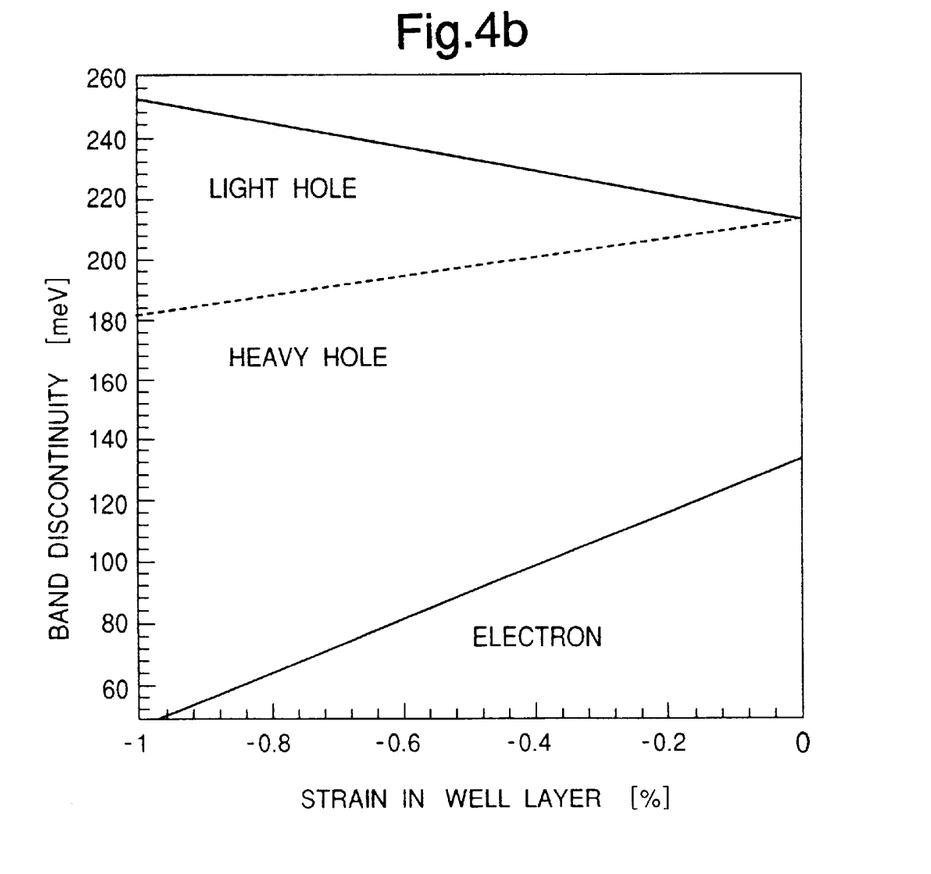

FIG. 4 shows, as an example, a result of a calculation on band discontinuity for electrons, heavy holes, and light holes with respect to a barrier layer. Here, $In_{.810}Ga_{.190}As_{.405}P_{.595}$ (no strain, bandgap wavelength $\lambda g=1.13$ $\mu m$) is used as the barrier layer, and the well layer is caused to change from $In_{.539}Ga_{.461}As_{.981}P_{.019}$ (strain: $\epsilon=0.0\%$) to $In_{.395}Ga_{.605}As_{.981}P_{.019}$ (strain: $\epsilon=-1.0\%$). From the figure, it can be appreciated that, if the quantum well structure is formed with electrons and light holes, by changing the strain from −1.0% to about −0.5%, the band discontinuity of electrons is increased by 43 meV, while the band discontinuity of light holes is decreased by 21 meV.

Figure 5:
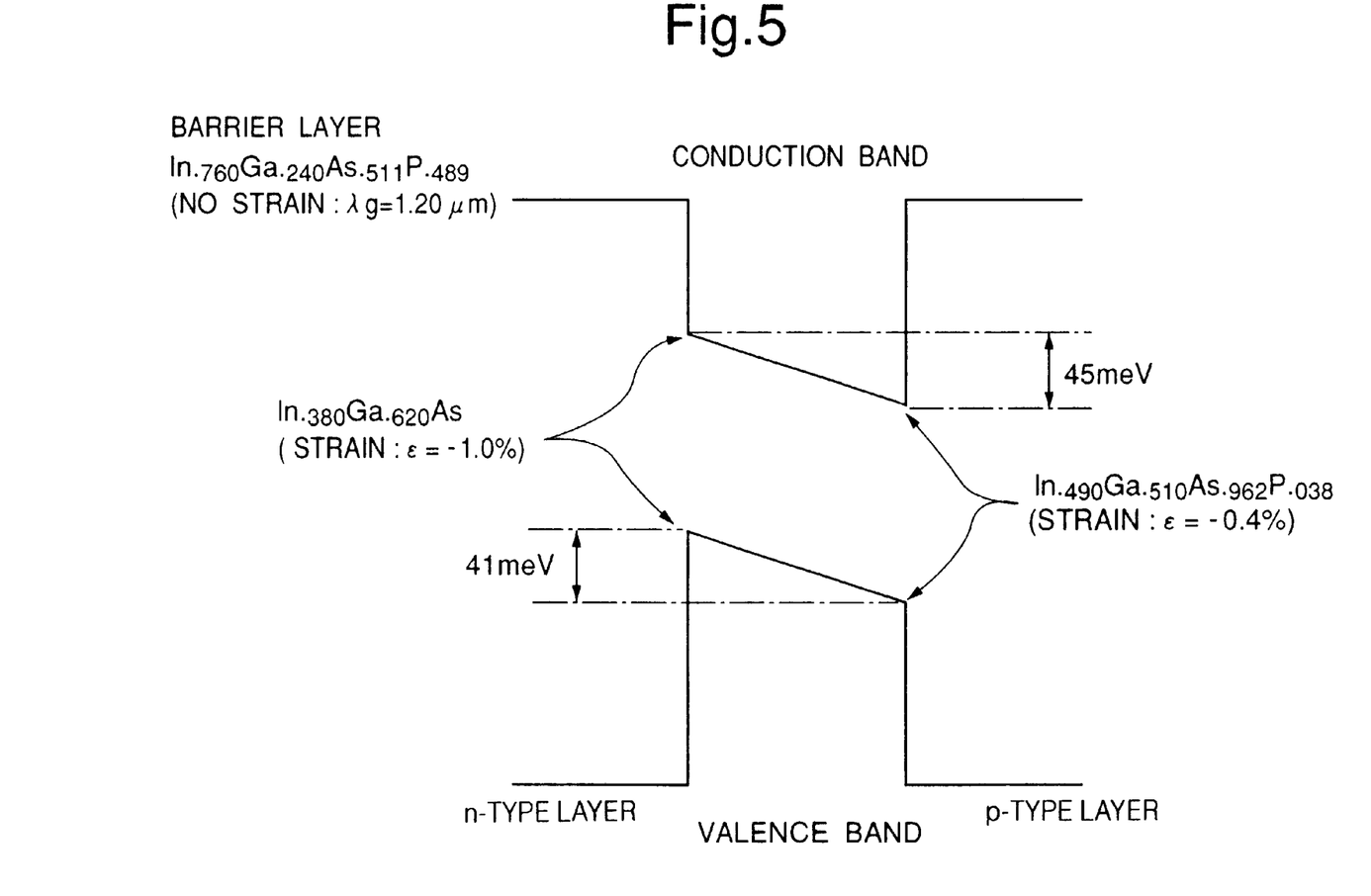
FIG. 5 is a band diagram for illustrating the operation of a first embodiment.

In the example shown in FIG. 4, since only the composition ratio of group III (Ga/In ratio) is changed, while the composition ratio of group V (As/P ratio) is kept constant, the amount of band discontinuity differs for the electrons and the holes, so that the bandgap itself changes. Since the bandgap is preferably to be constant in the quantum well, FIG. 5 shows a result of investigation on a structure in which both groups III and V are changed. It is a band diagram when $In_{.760}Ga_{.240}As_{.511}P_{.489}$ (no strain, bandgap wavelength $\lambda g=1.20$ $\mu m$) is used as the barrier layer, and both groups III and V are linearly changed for the well layer from $In_{.380}Ga_{.620}As$ (strain: $\epsilon=-1.0\%$) to $In_{.490}Ga_{.510}As_{.962}P_{.038}$ (strain: $\epsilon=-0.4\%$). In this structure, the increase of band discontinuity of electrons is 45 meV, while the decrease of band discontinuity of holes is 41 meV, which are similarly on the same level. In other words, the band discontinuity of the conduction band (electron) and valence band (hole) can be linearly changed in one quantum well without changing the bandgap.

Since the built-in potential changing in one quantum well is 43 meV if the built-in voltage is 0.65 V, the thickness of i-layer including the MQW absorption layer is 0.18 μm, and the well layer width is 12 nm, the actual built-in field can be canceled with the above-mentioned structure.

Hereinafter, the present invention is described with reference to the drawings.

FIRST EXAMPLE

Figure 6:
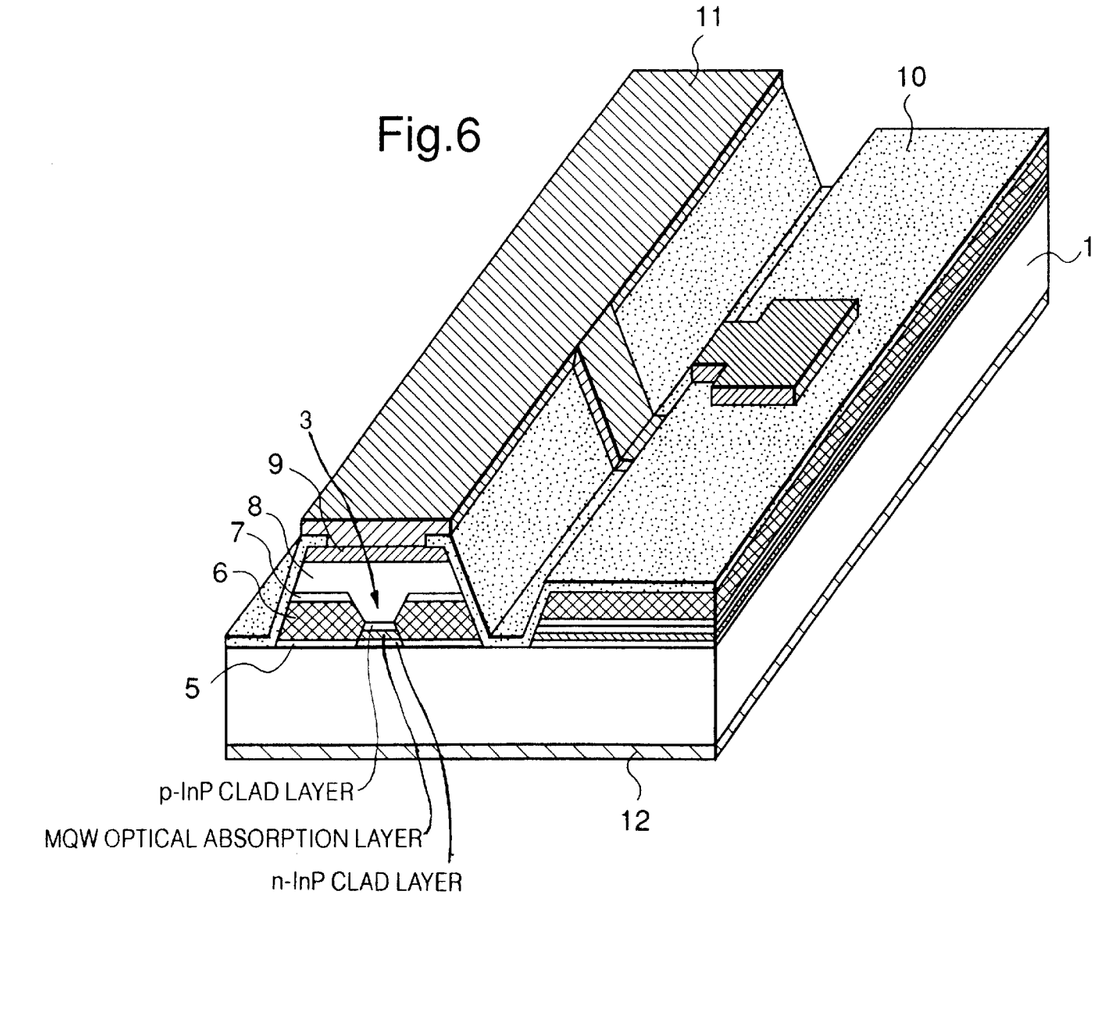
FIG. 6 shows a device structure for illustrating an embodiment of the present invention.
Figure 7:
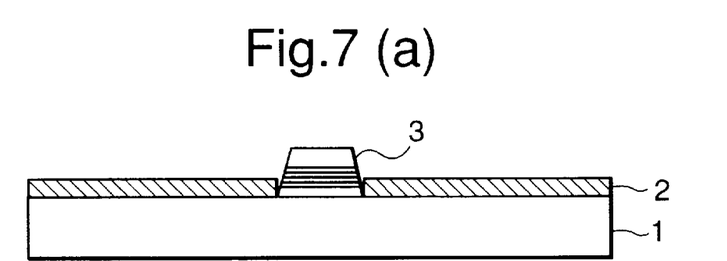
FIG. 7(a) to FIG. 7(d) show sectional views of a device during its fabrication process for illustrating the example of the present invention.

A first example of the present invention is described with reference to FIGS. 5, 6 and 7.

FIG. 7(a) to FIG. 7(d) show cross sectional views of a device during its fabrication process for illustrating the first example. FIG. 5 is a band diagram of the MQW absorption layer. FIG. 6 is a perspective view of the MQW-EA modulator fabricated by the first example.

First, as shown in FIG. 7(a), silicon oxide was deposited for 100 nm on an n-InP substrate with an atmospheric pressure CVD process. It was patterned so that stripes are oriented in the [011] direction of the n-InP substrate to form a silicon oxide mask 2. Here, it was formed to have mask spacing of 1.5 μm and mask width of 10 μm. An optical waveguide structure 3 containing an MQW absorption layer was selectively grown in this opening of 1.5 μm by using a low pressure metalorganic vapor phase epitaxy (MOVPE). The growth pressure was 100 hPa, and the growth temperature was 625° C. The material used was trimethylindium (TMIn), triethylgallium (TEGa), diethylzinc (DEZn), arsine $(AsH_3)$, phosphine $(PH_3)$, disilane $(Si_2H_6)$, and bis cyclopentadienyl iron (ferrocene).

The optical waveguide structure 3 consisted of an n-InP clad layer (0.1 μm thick), an MQW optical absorption layer, and a p-InP clad layer (0.1 μm thick). The MQW optical absorption layer has non-doped $In_{.760}Ga_{.240}As_{.511}P_{.489}$ (no strain, bandgap wavelength λ=1.20 μm, 15 nm thick) as an n type side separate confinement heterostructure (SCH) light confinement layer, non-doped $In_{.760}Ga_{.240}As_{.511}P_{.489}$ (6 nm thick) as a barrier layer, and an InGaAs (P) layer (12 nm thick) as a well layer. The composition of the well layer was linearly varied, within a single well layer, as shown in FIG. 5, for both groups III and V from $In_{.380}Ga_{.620}As$ (strain: ε=−1.0%) on the n-InP substrate to $In_{.490}Ga_{.510}As_{.962}P_{.038}$ (strain: ε=−0.4%) on the p-region side. In addition, the total number of quantum wells was eight. The p-region SCH structure was a two-stage structure comprising non-doped $In_{.760}Ga_{.240}As_{.511}P_{.489}$ (15 nm thick) and non-doped $In_{.875}Ga_{.125}As_{.265}P_{.735}$ (17 nm). The bandgap wavelength was estimated by microscopic photoluminescence to be 1.510 μm.

Then, as shown in FIG. 7(b), a silicon oxide mask 4 was formed on the top of the optical waveguide structure 3 and at the sides of the optical waveguide structure 3 with separations of 3 μm from the bottom of the optical waveguide. Subsequently, a burying selective growth was performed on each side of the optical waveguide structure with an n-InP layer 5 (carrier concentration of $5×10^{17}$ cm$^{-3}$, thickness of 0.2 μm), an Fe doped high resistance InP layer 6 (thickness of 10 μm), and an n-InP layer 7 (carrier concentration of $5×10^{17}$ cm$^{-3}$, thickness of 0.2 μm), laminated in this order.

Then, after the silicon oxide mask 4 was removed from the top of the optical waveguide structure 4, a p-InP layer 8 (carrier concentration of $1×10^{18}$ cm$^{-3}$, thickness of 1.5 μm) and a P$^+$-InGaAs cap layer 9 (carrier concentration of $6×10^{18}$ cm$^{-3}$, thickness of 0.3 μm) were grown. After the P+-InGaAs cap layer 9 and the p-InP clad layer 8 and the n-Inp clad layer 7 were removed from the region where a pad electrode is to be formed, the MQW-EA modulator as shown in FIG. 6 was formed through an electrode formation process.

The modulator fabricated by this example was cut into 200 μm long devices, and coated on each end surface with a low reflection coating of a reflection coefficient of 0.1%, and evaluated for the extinction characteristics by entering light from a DFB laser with an oscillating wavelength of 1.550 μm. It revealed a high extinction ratio of 25 dB when applying 1 V to the modulator, and 40 dB when it was 2 V. When the applied voltage was zero, a sufficiently low absorption loss of 3 dB was obtained. When a DFB laser beam of +10 dB was entered, +4 dBm was output from the modulator. In addition, the 3 dB modulation band width was 20 GHz.

When 2.5 Gb/s modulation was performed at the drive voltage of 1 V, and transmission was carried out over a 300 km long normal optical fiber, the power penalty was 0.5 dB or less. When 10 Gb/s modulation was performed at the drive voltage of 1 V, and transmission was carried out over a 100 km long normal optical fiber, the power penalty was 0.5 dB of less.

SECOND EXAMPLE

Figure 8:
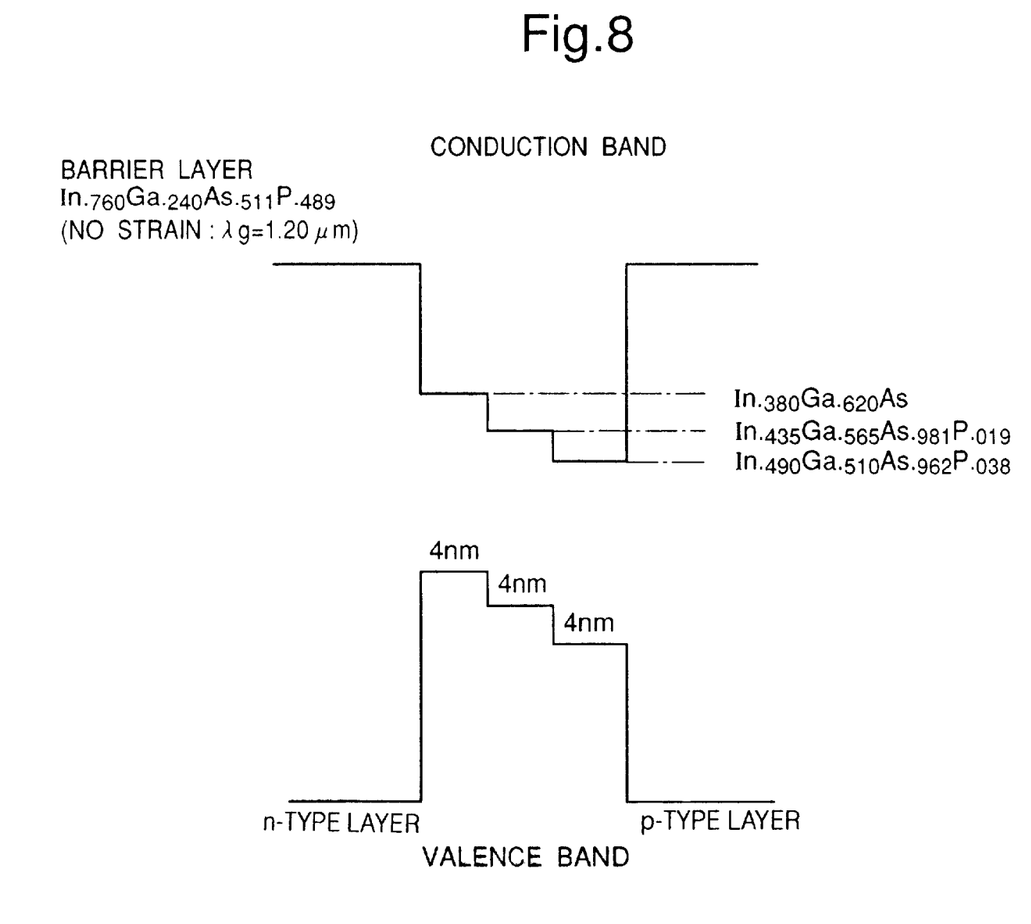
FIG. 8 is a band diagram for illustrating a second embodiment of the present invention.

A second example of the present invention is described with reference to FIGS. 6, 7 and 8.

FIG. 7(a) to FIG. 7(d) show cross sectional views of a device during its fabrication process for illustrating the second example. FIG. 8 is a band diagram of the MQW absorption layer. FIG. 6 represents a perspective view of the MQW-EA modulator fabricated by the second example.

It is an example for a different MQW optical absorption layer although the device fabricating process is same as the first example. The MQW optical absorption layer consisted of, as shown in FIG. 8, non-doped $In_{.760}Ga_{.240}As_{.511}P_{.489}$ (no strain, bandgap wavelength (λ.g=1.20 μm thicknessof 15 nm) as an n region side light confinement layer (SCH layer), non-doped $In_{.760}Ga_{.240}As_{.511}P_{.489}$ (6 nm thick) as a barrier layer, and a well layer. Each one of the single quantum well layers comprised three sequentially layers of a 4 nm thick $In_{.380}Ga_{.620}As$ (stain: ε=−1.0%), a 4 nm thick $In_{.435}Ga_{.565}As_{.981}P_{.019}$ (strain: ε=−0.7%), and a 4 nm thick $In_{.490}Ga_{.510}As_{.962}P_{.038}$ (strain: ε=−0.4%), formed in this order from the n-substrate side. The number of single quantum wells was eight. The p-region SCH structure was a two-stage structure of non-doped $In_{.760}Ga_{.240}As_{.511}P_{.489}$ (15 nm thick) and non-doped $In_{.875}Ga_{.125}As_{.265}P_{.735}$ (17 nm thick). The bandgap wavelength was estimated by the microscopic photoluminescence to be 1.510 μm.

The burying process was also same as that of the first example. An MQW-EA modulator structure was obtained through an electrode formation process.

The modulator fabricated by this example was cut into 200 μm long devices, and coated on each end surface with a low reflection coating of a reflection coefficient of 0.1%, and evaluated for the characteristics by entering light from a DFB laser with an oscillating wavelength of 1.550 μm. It revealed a high extinction ratio of 23 dB when applying 1 V to the modulator, and 38 dB when it was 2 V. When the applied voltage was zero, a sufficiently low absorption loss of 3 dB was obtained. When a DFB laser beam of +10 dBm was entered, +4 dBm was output from the modulator. In addition, the 3 dB modulation band width was 20 GHz.

When 2.5 Gb/s modulation was performed at the drive voltage of 1 V, and transmission was carried out over a 300 km long normal optical fiber, the power penalty was 0.5 dB or less. When 10 Gb/s modulation was performed at the drive voltage of 1 V, and transmission was carried out over a 100 km long normal optical fiber, the power penalty was 0.5 dB of less.

While the above example only describes the MQW-EA modulator itself, since, like the first example, the MQW structure is formed by the MOVPE selective growth, it can be easily integrated with a distributed feedback (DFB) laser.

In addition, while the above example only shows a case of burying structure using the MOVPE selective growth, since the present invention relates to the structure of MQW absorption layer, the fabricating process is not limited to this process, but may be a process with growth on the entire surface, mesa-etching, selective burying regrowth. Or, a combination of MOVPE selective growth and mesa-etching, or molecular beam epitaxy (MBE) is also plausible.

In addition, while the examples describes a case where the composition of quantum well is continuously varied (first example), and a case where it is varied in three stages, it is not limited to such two processes, but may be varied in any number of stages as long as it is two stages or more.

While the materials used for the examples are only InGaAs (P) types, the material is not limited to these materials but may be any semiconductor material as long as it can change the band discontinuity of conduction band and valence band in the opposite directions.

In addition, each quantum well may be composed of a short-period (strained) super-lattice consisting of a plurality of well layers and barrier layers.

While the present invention has been described in connection with certain preferred embodiments, it is to be understood that the subject matter encompassed by way of the present invention is not to be limited to those specific embodiments. On the contrary it is intended for the subject mattter of the invention to include all alternatives, modifications and equivalents as can be included within the spirit and scope of the following claims.

What is claimed is:

1. An electro-absorption type semiconductor optical modulator comprising:

an i-type semiconductor layer disposed between an n-type semiconductor layer and a p-type semiconductor layer, the i-type semiconductor layer comprising an optical absorption layer having a quantum well layer;

a first electrode in electrical contact with the n-type layer;

a second electrode in electrical contact with the p-type layer, wherein the electron affinity of the i-type semiconductor layer constituting said quantum well layer increases toward the p-type layer and the energy of the top of the valence band decreases toward the p-type layers wherein an absorption spectrum of said quantum well layer has an excitonic absorption peak, and a difference in photon energy of a working wavelength with a bias voltage applied on said first and second electrodes and of said excitonic absorption peak with no bias voltage applied thereon is less than 30 meV.

* * * * *